Nov. 10, 1970       D. C. ALLISON       3,538,539
AUTOMATIC DOORSTOP HINGE
Filed Dec. 13, 1967       3 Sheets-Sheet 1
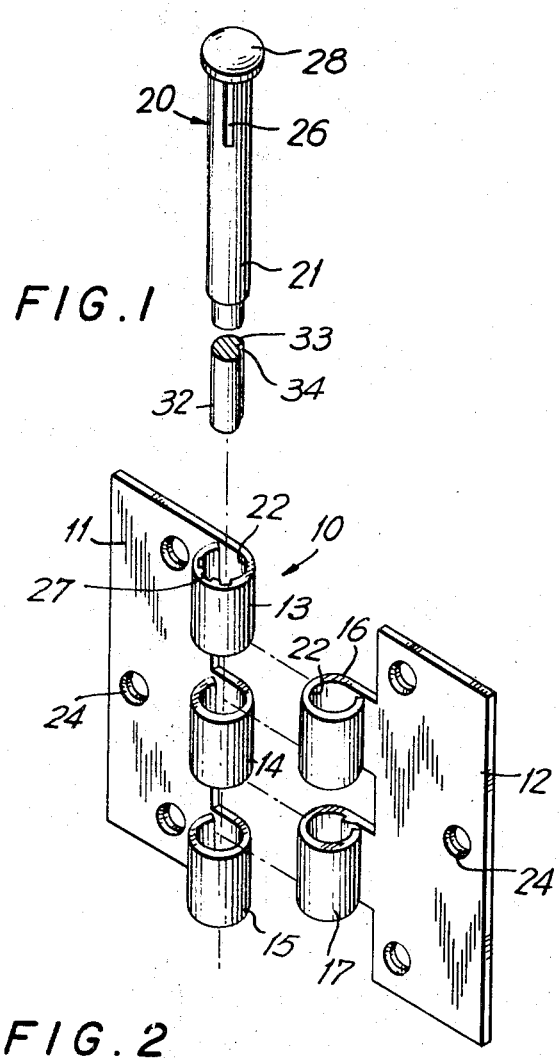
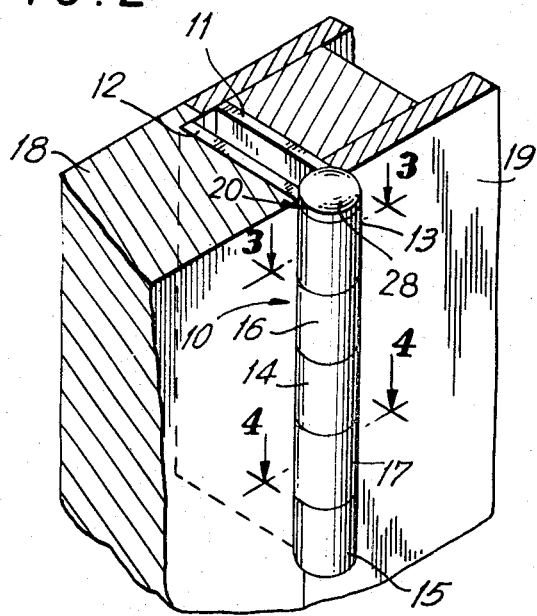
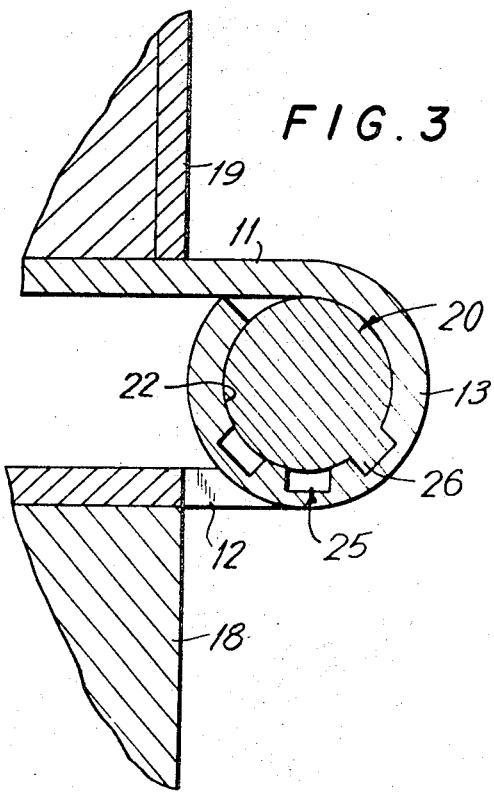
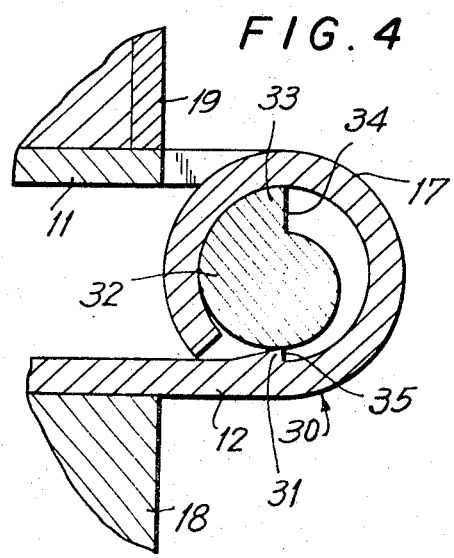
INVENTOR.
D. CLIFFORD ALLISON
BY
Leonard W. Suroff
ATTORNEY Nov. 10, 1970 D. C. ALLISON 3,538,539
AUTOMATIC DOORSTOP HINGE
Filed Dec. 13, 1967 3 Sheets-Sheet 2
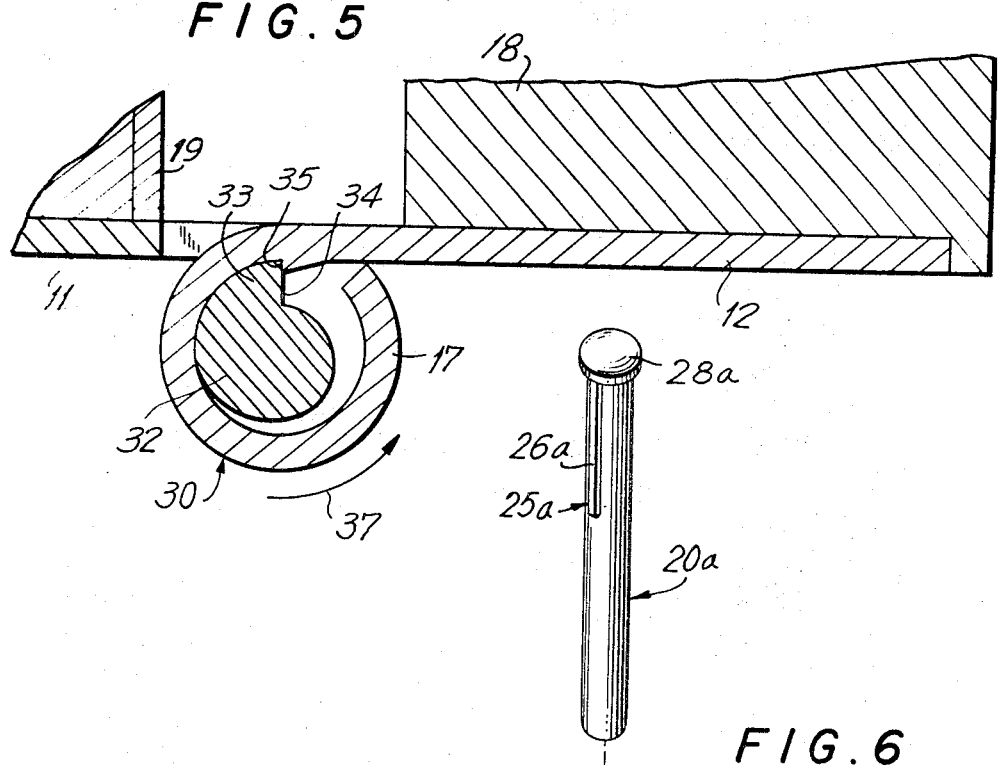
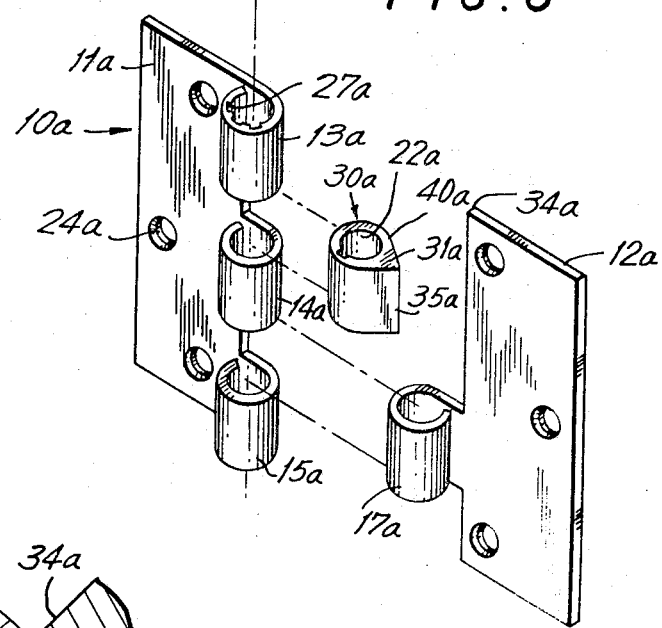
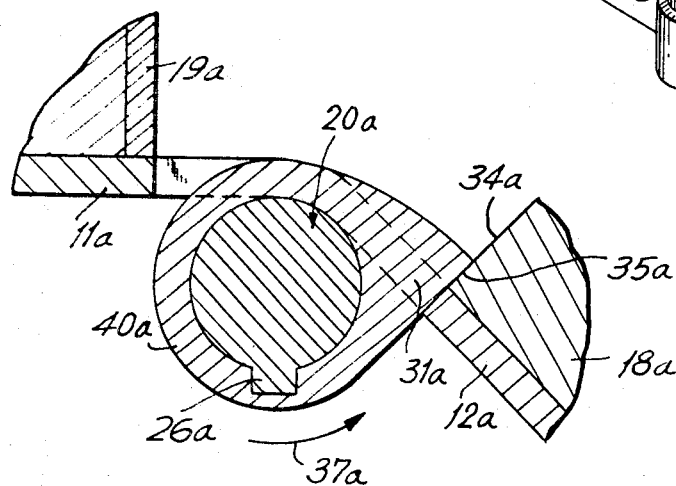
INVENTOR.
D. CLIFFORD ALLISON
BY Leonard W. Suroff
ATTORNEY Nov. 10, 1970  D. C. ALLISON  3,538,539
AUTOMATIC DOORSTOP HINGE
Filed Dec. 13, 1967  3 Sheets-Sheet 3

INVENTOR.
D. CLIFFORD ALLISON
BY
Leonard W. Suroff
ATTORNEY

United States Patent Office 3,538,539
Patented Nov. 10, 1970

3,538,539
AUTOMATIC DOORSTOP HINGE
Dale Clifford Allison, 2340 N. Richmond Ave.,
Wichita, Kans. 67202
Filed Dec. 13, 1967, Ser. No. 690,211
Int. Cl. E05d 11/06
U.S. Cl. 16—191
2 Claims

ABSTRACT OF THE DISCLOSURE

A hinge assembly, as for use on doors, of the type which may be adjusted so that the angular opening between the door casing and door may be controlled. The hinge structure consisting of hinge plates having interdigitating axially aligned knuckles with a hinge pin extending therethrough and having an outwardly extending rib which is adapted to mate with one or more vertical grooves contained in one of the knuckles to provide for a locking of the hinge pin in a selected fixed relation to one of the hinge plates and stop means in the form of a cam element on said pin and a coacting cam element or stop on a knuckle of the other hinge plate adapted to engage with and stop the angular rotation between the hinge plates. In accordance with another embodiment, the stop means is on the exterior of the hinge structure.

BACKGROUND AND SUMMARY OF THE INVENTION

The invention relates generally to improvements in adjustable hinges for use in a conventional mounting arrangement as for use on doors and more particularly to an improved hinge structure in which the adjustability limiting the angle of opening of the hinge is obtained by locking the hinge pin in position and providing camming means between either the hinge pin and hinge knuckle, the hinge knuckle and hinge plate, or the hinge pin and hinge plate, to retain a complementary pair of hinges in a preselected stopped position.

Conventional hinges are usually constructed in a manner to permit relative free rotation of the hinge plates or leaves an angle of at least 180° and at times almost 360°. It has been found that there are many instances in which it is desirable that the hinge assembly have a wide opening angle, but with controlled limits to provide a stop to limit the angular movement between the hinge plates. For example, in the case of doors or the like, in order to prevent the opening door or parts thereof such as the doorknob, from striking adjacent walls or other fixtures a stopping device is employed. The form of the stopping device may vary, for example, the conventional door stop which is mounted on the door or on the floor in the path of the door or a door supported check or the like. While these devices serve their purpose they possess many disadvantages and drawbacks. The drawbacks of these devices are that they are usually bulky, unsightly and inconvenient devices to employ, often malfunctioning and becoming loose and frequently marking the wall, door or floor with which they are associated and otherwise leave much to be desired.

Heretofore, adjustable stop hinges have been proposed, to overcome the objections to the doorstops discussed above, but these have found limited acceptability due to their bulkiness in design and difficulty in providing the required adjustability between the member supported by the hinge, such as a door, and the support frame to which the opposite end of the hinge is secured. This inability to easily adjust the degree of rotation and the bulkiness of the prior art hinges have been limiting factors in their use. For example, a conventional one of such automatic stop hinges includes external adjustment means which is quite noticeable when viewing the hinge.

Applicant has now discovered that the difficulties of the prior art may be obviated by providing an adjustable hinge in which in accordance with one embodiment the means for limiting the travel of the mating hinge plates is entirely contained within the knuckles of the hinge plates. In addition the size of the hinge knuckles is generally of the same size as found on conventional hinges.

In addition the adjustability is easily accomplished by merely partially removing the hinge pin from the assembly and manually rotating to one or more positions and inserting therein to alter the degree of angular rotation between the hinge plates.

In accordance with another embodiment the stop member for limiting the angular rotation between the hinge plates is adapted to be mounted on the hinge pin and replace a knuckle of the hinge plate that the pin is not secured to. The size of the stop member is not much larger than the knuckle replaced and again provides for a compact easily adjustable hinge assembly.

OBJECTIVES OF THE INVENTION

It is the general object of the present invention to avoid and overcome the foregoing and other difficulties of and objections to prior art practices by the provision of an improved hinge structure provided with easily adjustable means limiting the angular movement between the respective hinge plates.

A further object of the invention resides in the provision of a novel adjustable stop hinge which will eliminate the necessity of conventional door stops and the like.

A further object of the invention resides in the provision of a stop hinge which is adapted to perform the functions of both a hinge and a door stop.

Yet another object of the present invention is to provide external means for limiting the angular rotation between the respective hinge plates.

Still another object of the present invention is to provide a hinge stop which is variable between at least three hinge openings of different angles.

Yet a further object of the present invention is to provide a hinge stop wherein a gradual stopping of the hinge, as well as the door upon which it is mounted, is effected so as to avoid any sudden jarring.

Still yet a further object of the instant invention to provide a hinge structure wherein the adjustable means is incorporated so as to be hidden from view and provide for a degree of torsional movement relative to the fixed hinge plate thus obtaining a gradual slowing down of the door before reaching its final position.

Still further objects and features of this invention reside in the provision of a stop hinge that is strong and durable, simple in construction and manufacture, unobstrusive in appearance, and inexpensive to manufacture, thereby permitting wide distribution and utilization.

BRIEF DESCRIPTION OF THE DRAWINGS

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an exploded perspective view of one form of the invention showing the components in their to be assembled relationship;

FIG. 2 is a perspective view of the hinge of FIG. 1, shown mounted to a door jamb and related door in closed position;

FIG. 3 is an enlarged horizontal section taken on the line 3—3 of FIG. 2; to illustrate the adjustability of the hinge pin with respect to the hinge plate;

FIG. 4 is an enlarged horizontal section taken on the line 4—4 of FIG. 2; to illustrate the stop means which controls the degree of angular opening between the hinge plates;

FIG. 5 is an enlarged view similar to FIG. 4, but illustrating the stop means in position when the hinge plates are in their open position;

FIG. 6 is a perspective view similar to FIG. 1, but illustrating another form of the invention;

FIG. 7 is a view similar to FIG. 5, showing the stop means when the hinge plates are in their open position in accordance with the form of the invention as illustrated in FIG. 6;

DETAILED DISCUSSION OF THE DRAWINGS

The present invention contemplates the provision of an improved hinge structure of the character described comprising a pair of hinge plates, having interdigitating axially aligned substantially cylindrical knuckles along the adjacent edges thereof, a hinge pin registering with said knuckles, means for locking the hinge pin in a respective angular position and which is circumferentially adjustable with respect to said knuckle. Stop means contained internally within a knuckle in one embodiment and externally in another embodiment, provide for the obtainment of the angular degree of opening between the hinge plates in their open position.

In accordance with another embodiment illustrated in 1 through 5 inclusive, the stop means is in communication with and entirely contained within the knuckles of the hinge plates. The hinge pin which is circumferentially adjustable with respect to said knuckle, and contains a cam surface that has a mating cam surface within the knuckle. By positioning the hinge pin in a preselected position the angular rotation between the hinge plates may be controlled and regulated.

In accordance with another embodiment illustrated in FIGS. 6 and 7 inclusive, the stop means is in the form of a stop member mounted in coaxial alignment with the hinge pin and having an external cam surface in communication with the hinge plate moved relative thereto until said cam surface engages the surface of said hinge plate.

Figure 10:
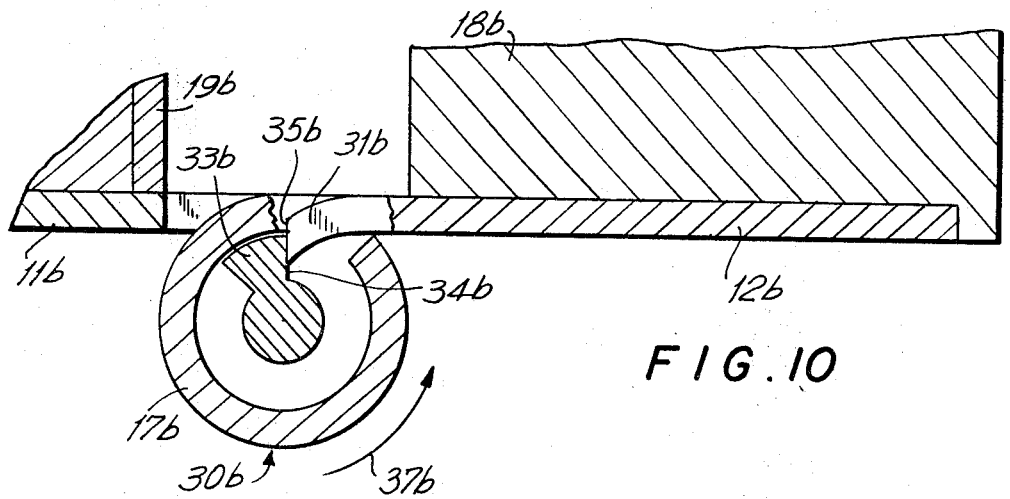
FIG. 10 is an enlarged view similar to that of FIG. 5, illustrating the stop means when the hinge plates are in their open position.
Figure 9:
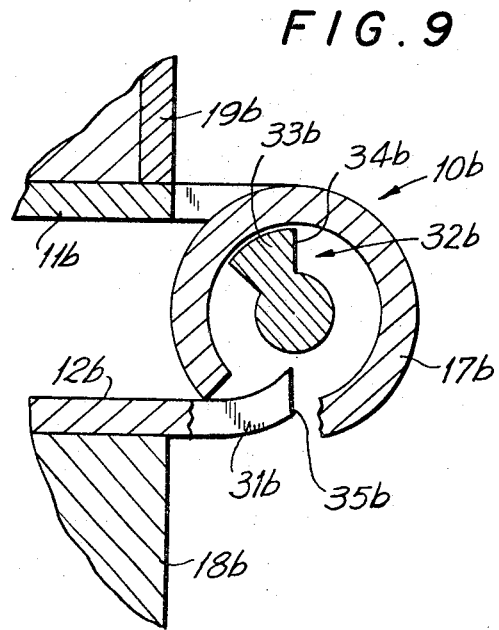
FIG. 9 is an enlarged horizontal view similar to that of FIG. 4, but illustrating the form of the invention in FIG. 8.
Figure 8:
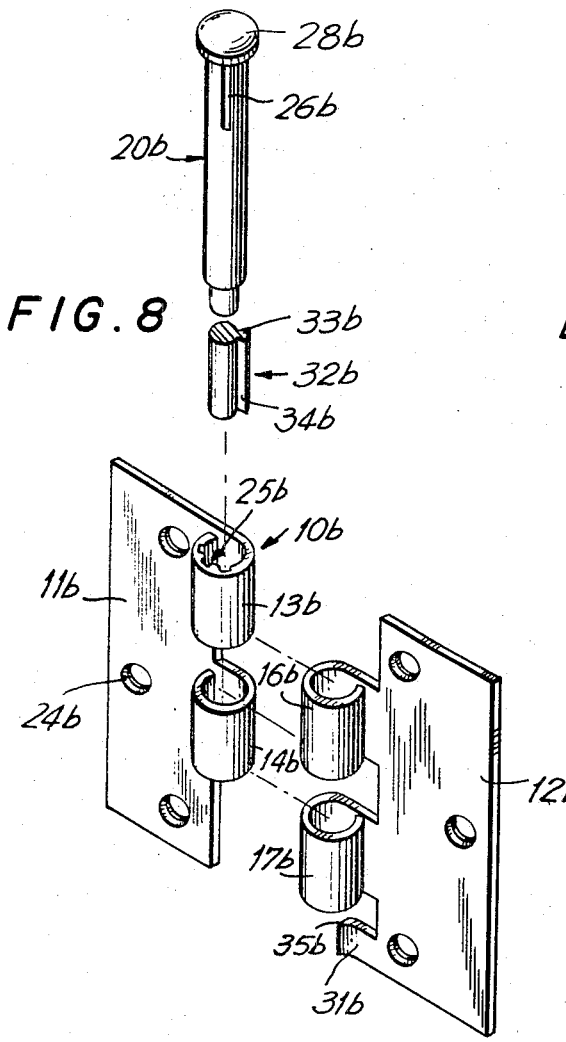
FIG. 8 is a perspective view similar to FIG. 1, but illustrating another form of the invention.

In accordance with another embodiment illustrated in FIGS. 8–10 inclusive, the stop means is contained on the hinge pin which is in communication with a hinge plate to control the angular movement between the respective hinge plates.

Referring to the drawings in detail and particularly to FIGS. 1 through 5, wherein reference numeral 10 refers to the adjustable stop hinge having a pair of complementary hinge plates or leaves 11 and 12 having formed along their adjacent vertical adjacent edges in the usual manner interdigitating substantially tubular cylindrical knuckles 13, 14 and 15 on hinge plate 11, 16 and 17 on hinge plate 12, which are axially aligned and engaged by a registering headed hinge pin 20. For convenience, the hinge plates 11 and 12 will be identified as the first and second hinge plates, respectively. The shaft 21 of the hinge pin 20 is of a diameter which is less than the diameter of the cylindrical bore 22 of the knuckles to provide a slight clearance so that the hinge plates are freely angularly rotatable with respect to each other.

As seen in FIG. 3, the stop hinge 10 is adapted to be utilized in conjunction with a door 18 and a door frame 19 to which the hinge plates 11 and 12 are attached respectively, by suitable fasteners extending through the mounting apertures 24 and into the door 18 and door frame 19.

Locking means 25, as seen in FIGS. 1 and 3, is provided to adjustably position the hinge pin 20 in different angular positions with respect to hinge plate 11, so that the angular spacing or opening between the hinge plates 11 and 12 may be controlled. The locking means 25 is contained within knuckle 13 in a manner that it is not visible to someone seeing the hinge assembly 10, and includes outwardly integrally formed projection or toe 26, which may be of a rectangular shape, extending vertically along the axis of the hinge pin a length substantially equal to that of its mating knuckle 13. The bore 22 of said mating knuckle 13 is provided with a plurality of vertically extending grooves or slots 27, which may be of rectangular configuration for strength purposes, three being shown, each adapted to receive said complementary rectangular projection 26 in order to retain the hinge pin in fixed relation to the first hinge plate 11 and providing for the adjustment of the hinge pin in different angular positions with respect thereto. Although the hinge pin is illustrated with a single projection 26 it is appreciated that a plurality of projections may be provided and that a greater number of grooves 27 may also be provided to permit a greater degree of adjustability if deemed necessary. By providing a single projection the applicant has found that while maintaining the knuckle diameter as substantially found in the conventional hinge the necessary strength may be provided to stop and retain the hinge and the door, or other member associated therewith, without shearing off the projection. The dimensional relationship between the grooves 27 and projection 26 is such that the hinge pin 20 drops freely through the hinge assembly 10 until the head 28 of the hinge pin is seated against the knuckle 13. At this point the hinge pin mates and is thus fixed in position with respect to the first hinge plate 11.

As illustrated in FIGS. 4 and 5, stop means 30 contained within the axial length of a knuckle within the hinge assembly is provided to control the angular opening between the hinge plates 11 and 12, and may be in the form of internal cam means including coacting cam elements contained respectively on the hinge pin 20 and on an associated knuckle through which the hinge pin extends. The cam elements are adapted to engage each other so as to control the degree of free angular rotation between the first and second hinge plates, the second hinge plate 12 is provided with an offset cam or cam extention 31 contained in knuckle 17, and depending upon the size of the hinge as well as other related factors may also be contained in knuckle 16 as well. The hinge pin 20 is provided with a mating vertically extending cam stop portion or rib 32 having an arm 33 with an abutting edge 34 for engagement with the cam surface 35 of the cam extension 31. As the door, or other mounted member, swings through its arc, as indicated by the arrow 37, it carries the hinge plate 12 until the cam surface 35 strikes the abutting edge 34, as seen in FIG. 5, at this point the angular rotation between the hinge plates 11 and 12 will be stopped in its preselected position.

The degree of free angular rotation is fully adjustable by the position of the cam means 30. This is accomplished by raising the entire pin 20, rotating the pin to set the mating cam 32 in position for the desired door swing, and then dropping the hinge pin to mate the projection 26 with one of the grooves 27 in the first hinge plate 11.

The pin is preferably also designed to act as resilient means for gradually stopping the relative movement between the hinge plates after the coacting cam elements have engaged each other. This imparts a cushioned rather than sudden stop to the door. Most of the length of the pin will act in this shock absorbing manner when the torsional forces are applied thereto. It is contemplated that a conventional steel pin will be adequate and will provide this resilient torsional action. However, if greater cushioning is desired, a material such as nylon, of the kind used for bearings and bolts, may be used to add this additional cushioning effect.

FIGS. 6 and 7 illustrate the embodiment of the invention 10a in which the stop means 30a includes a stop member 40a mounted in coaxial alignment with the hinge pin 20a and circumferentially adjustable with respect thereto. The stop member 40a may generally replace one of the knuckles of the second hinge plate 12a and preferably be positioned in communication with the first hinge plate 11a as between a pair of knuckles thereof, as illustrated between knuckles 13a and 14a. The stop member 40a has a vertical height which permits it to be positioned between said respective knuckles. Cam means in the form of a vertically extending external cam extension 31a terminating in a cam surface 35a is provided and which is engageable with the second hinge plate 12a when the latter is moved relative thereto in the direction of arrow 37a. The cam surface 35a engages the abutting edge 34a of the second hinge plate 12a, the latter in this instance acting as the cam arm or stop of the embodiment illustrated in FIGS. 1–5.

In a similar manner as illustrated in FIGS. 1–5 the hinge plates 11a and 12a, have interdigitating axially aligned substantially cylindrical knuckles along the adjacent edges thereof and the hinge pin 20a registering with the knuckles 13a, 14a, 15a and 17a. The locking means 25a, for locking the hinge pin 20a in a respective angular position and still permit circumferential adjustment with respect to the first hinge plate 11a, includes an outwardly formed projection 26a extending vertically along the axis of the hinge pin a length substantially equal to its mating knuckle 13a and stop member 40a. The mating knuckle 13a is provided with a plurality of vertically extending grooves 27a to receive said projection 26a.

The locking means 25a, in this embodiment, is such that the rib 26a extends downwardly along the hinge pin 20a to approximately where the hinge knuckle 14a begins. Accordingly the stop member 40a, in its inner bore 22a, is provided with at least one vertical groove 27a, three being shown, which are adapted to receive the rib 26a and be adjusted in angular relationship thereto.

The degree of door swing is adjusted by moving the hinge pin 20a upward in the hinge assembly 10a until the portion of the locking means is free from the stop member 40a and then rotating the stop member to the desired stopping position. In this position the groove 27a in the stop member is in alignment with a groove in knuckle 13a, and the pin 20a is then reinserted to mate with the stop member 40a.

To add an additional torsion effect, the camming means may be built to fit at a lower part of the hinge and the hinge assembly altered accordingly. Of course, a hinge pin of different material beside metal as described in the discussion of the internal method may also be employed.

FIGS. 8–10 inclusive, illustrate the embodiment of the invention 10b in which a knuckle is modified to provide a cam extension 31b having a curved portion terminating in a cam surface 35b. The hinge pin 20b is provided with a mating vertically extending cam stop portion or rib 32b having an arm 33b with an abutting edge 34b for engagement with the cam surface 35b of the cam extension 31b. As the door, or other mounted member, swings through its arc, as indicated by the arrow 37b, it carries the hinge plate 12b until the cam surface 35b strikes the abutting edge 34b, as seen in FIG. 10, at this point the angular rotation between the hinge plates 11b and 12b will be stopped in its preselected position.

In a similar manner as illustrated in FIGS. 1–5 the hinge plates 11b and 12b, have interdigitating axially aligned substantially cylindrical knuckles along the adjacent edges thereof and the hinge pin 20b registering with the knuckles 13b, 14b, 16b and 17b. The locking means 25b, for locking the hinge pin 20b in a respective angular position and still permit circumferential adjustment with respect to the first hinge plate 11b, includes an outwardly formed projection 26b extending vertically along the axis of the hinge pin a length substantially equal to its mating knuckle 13b. The mating knuckle 13b is provided with a plurality of vertically extending grooves 27b to receive said projection 26b.

I claim:
1. An adjustable stop hinge, comprising:
 (A) first and second hinge plates each having interdigitating axially aligned substantially cylindrical knuckles along the adjacent edges thereof,
 (B) a hinge pin registering with said knuckles,
 (C) means contained within a knuckle of said first hinge plate adjustably locking said hinge pin in different angular positions relative thereto, and still permitting said first and second hinge plates to be freely angularly rotatable with respect to each other, and
 (D) stop means positioned along the axial length of said hinge pin and in communication with said second hinge plate for controlling the degree of free relative rotation between said first and second hinge plates to a preselected position, and wherein said stop includes coacting cam elements integrally formed respectively on said hinge pin and on said second hinge plate, said cam elements adapted to engage each other so as to control the degree of free angular rotation between said first and second hinge plates, said coacting cam elements include
  (1) a vertically extending rib on said hinge pin, and
  (2) a mating cam surface on said second hinge plate adapted to engage said rib for limiting the angular rotation between said first and second hinge plates, said mating cam surface is contained within a knuckle of said second hinge plate through which said hinge pin extends.

2. An adjustable stop hinge comprising:
 (A) first and second hinge plates each having interdigitating axially aligned substantially cylindrical knuckles along the adjacent edges thereof,
 (B) a hinge pin registering with said knuckles,
 (C) means contained within a knuckle of said first hinge plate adjustably locking said hinge pin in different angular positions relative thereto, and still permitting said first and second hinge plates to be freely angularly rotatable with respect to each other, said means for adjustably locking said hinge pin relative to said first hinge plate includes
  (1) an outwardly formed projection extending along the vertical axis of said hinge pin a length substantially equal to that of its mating knuckle on said first hinge plate, and
  (2) a plurality of vertically extending grooves contained within said mating knuckle, each adapted to receive said projection for adjustment of the hinge pin in different angular positions with respect to said first hinge plate,
 (D) stop means positioned along the axial length of said hinge pin and in communication with said second hinge plate for controlling the degree of free relative rotation between said first and second hinge plates to a preselected position, and wherein said stop means includes coacting cam elements integrally formed respectively on said hinge pin and on said second hinge plate, said cam elements adapted to engage each other so as to control the degree of free angular rotation between said first and second hinge plates, said coacting cam elements include (3) a vertically extending rib on said hinge pin, and
(4) a cam surface on said second hinge plate adapted to engage said rib for limiting the angular rotation between said first and second hinge plates.

References Cited
UNITED STATES PATENTS 2,930,075 3/1960 Deutchman et al. ----- 16—191
1,903,251 3/1933 Ahrens -------------- 16—191

BOBBY R. GAY, Primary Examiner

D. L. TROUTMAN, Assistant Examiner